United States Patent
Xu et al.

(10) Patent No.: US 12,328,687 B2
(45) Date of Patent: Jun. 10, 2025

(54) POWER CONTROL METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 711 days.

(21) Appl. No.: 17/482,945

(22) Filed: Sep. 23, 2021

(65) Prior Publication Data

US 2022/0030529 A1   Jan. 27, 2022

Related U.S. Application Data

(63) Continuation of application No. PCT/CN2019/081601, filed on Apr. 4, 2019.

(51) Int. Cl.
*H04W 52/58* (2009.01)
*H04W 52/16* (2009.01)

(52) U.S. Cl.
CPC ........... *H04W 52/58* (2013.01); *H04W 52/16* (2013.01)

(58) Field of Classification Search
CPC ... H04W 52/58; H04W 52/16; H04W 52/367; H04W 72/21; H04W 52/0229;
(Continued)

(56) References Cited

U.S. PATENT DOCUMENTS

2019/0261362 A1* 8/2019 Chen .................. H04L 5/0053
2020/0022087 A1* 1/2020 Dou ................... H04W 52/40
(Continued)

FOREIGN PATENT DOCUMENTS

CN   101990746 A   3/2011
CN   102045823 A   5/2011
(Continued)

OTHER PUBLICATIONS

International Search Report with English Translation for PCT/CN2019/081601 dated Jan. 2, 2020.
(Continued)

*Primary Examiner* — Ayaz R Sheikh
*Assistant Examiner* — Louis Samara
(74) *Attorney, Agent, or Firm* — Young Basile Hanlon & MacFarlane, P.C.

(57) ABSTRACT

A power control method, a terminal device and a network device are disclosed, wherein power adjustment information is associated with a resource, so that power control for URLLC is more targeted and is also more efficient. The power control method includes: a terminal device receiving first information, wherein the first information comprises at least one piece of power adjustment information; and the terminal device determining, according to the at least one piece of power adjustment information and power configuration information, a sending power, wherein the power configuration information at least comprises a first correlation, and the first correlation is a correlation between the power adjustment information and a resource.

17 Claims, 4 Drawing Sheets

(58) Field of Classification Search
CPC ............. H04W 52/0206; H04W 52/40; H04L 5/0053; H04B 7/043
See application file for complete search history.

(56) References Cited

U.S. PATENT DOCUMENTS

| | | | |
|---|---|---|---|
| 2020/0045693 A1* | 2/2020 | Yan | H04W 72/21 |
| 2021/0377864 A1* | 12/2021 | Li | H04W 72/044 |
| 2021/0400592 A1* | 12/2021 | Dou | H04W 52/367 |

FOREIGN PATENT DOCUMENTS

| | | | | |
|---|---|---|---|---|
| CN | 103391607 A | | 11/2013 | |
| CN | 106027130 A | * | 10/2016 | ............ H04B 7/043 |
| CN | 103944620 B | * | 7/2017 | |
| CN | 107277908 A | | 10/2017 | |
| CN | 108810874 A | | 11/2018 | |
| CN | 109314934 A | | 2/2019 | |
| CN | 109392065 A | | 2/2019 | |
| CN | 113727421 A | * | 11/2021 | ........ H04W 52/0206 |
| EP | 3907914 A1 | * | 11/2021 | ........... H04L 1/0026 |
| WO | WO-2018194412 A1 | * | 10/2018 | ............ H04W 72/04 |

OTHER PUBLICATIONS

Chinese First Office Action with English translation for Chinese Application No. 201980094354.8, Issued on Oct. 29, 2024, 21 pages.

Chinese Second Office Action with English translation for Chinese Application No. 201980094354.8, Issued on Dec. 25, 2024, 21 pages.

Chinese Third Office Action with English translation for Chinese Application No. 201980094354.8, issued Feb. 8, 2025, 18 pages.

Chinese Decision of Rejection with English translation for Chinese Application No. 201980094354.8, issued Apr. 7, 2025, 20 pages.

* cited by examiner

POWER CONTROL METHOD, TERMINAL DEVICE AND NETWORK DEVICE

CROSS-REFERENCE TO RELATED APPLICATION(S)

The present application is a continuation application of International Application No. PCT/CN2019/081601, filed on Apr. 4, 2019, the entire content of which is hereby incorporated by reference.

TECHNICAL FIELD

Implementations of the present disclosure relate to the field of communication, and more specifically, to a method for power controlling, a terminal device, and a network device.

BACKGROUND

Two services, Ultra-Reliable and Low Latency Communication (URLLC) and Enhance Mobile Broadband (eMBB), are introduced into a New Radio (NR) system. A feature of URLLC is that a transmission with ultra-high reliability (e.g., 99.999%) is realized within an extreme delay (e.g., 1 ms), and a feature of eMBB is that it is insensitive to delay, but a transmission quantity may be very large. In a scenario where URLLC and eMBB coexist, in order to realize an instant transmission of URLLC, there may be a collision between URLLC and eMBB, and an interference produced by an eMBB transmission will affect a transmission of URLLC, wherein a problem of a transmission collision between uplink URLLC and uplink eMBB is obvious especially. Therefore, it is an urgent technical problem to be solved to ensure a transmission of uplink URLLC when there is a transmission collision between uplink URLLC and uplink eMBB.

SUMMARY

Implementations of the present disclosure provide a method for power controlling, a terminal device, and a network device, in which power adjustment information is associated with a resource, so that power controlling for URLLC is more targeted and more efficient.

In a first aspect, a method for power controlling is provided, including: receiving, by a terminal device, first information, wherein the first information includes at least one piece of power adjustment information; and determining, by the terminal device, a transmit power according to the at least one piece of power adjustment information and power configuration information, wherein the power configuration information at least includes a first corresponding relationship, and the first corresponding relationship is a corresponding relationship between the power adjustment information and a resource.

It should be understood that the method for power controlling is used to control a transmit power of URLLC. That is, when there is a collision between URLLC and eMBB, an interference produced by an eMBB transmission is overcome by controlling the transmit power of URLLC.

It should be noted that, since power boosting made to overcome an interference of eMBB depends on resource positions of eMBB and URLLC, interpreting the power adjustment information based on the first corresponding relationship makes power controlling for URLLC be more targeted and more efficient.

In a second aspect, a method for power controlling is provided, including: sending, by a network device, first information, wherein the first information includes at least one piece of power adjustment information, there is a first corresponding relationship between the power adjustment information and a resource, and the first information is used for a terminal device to determine a transmit power.

In a third aspect, there is provided a terminal device configured to perform the method according to the first aspect described above or any of various implementations thereof.

Specifically, the terminal device includes function modules configured to perform the method according to the first aspect described above or any of various implementations thereof.

In a fourth aspect, there is provided a network device configured to perform the method according to the second aspect described above or any of various implementations thereof.

Specifically, the network device includes functional modules configured to perform the method according to the second aspect described above or any of various implementations thereof.

In a fifth aspect, there is provided a terminal device including a processor and a memory. The memory is configured to store a computer program, and the processor is configured to invoke and run the computer program stored in the memory to perform the method according to the first aspect described above or any of various implementations thereof.

In a sixth aspect, there is provided a network device including a processor and a memory. The memory is configured to store a computer program, and the processor is configured to invoke and run the computer program stored in the memory to perform the method according to the second aspect described above or any of various implementations thereof.

In a seventh aspect, there is provided an apparatus configured to implement the method according to any one of the first and second aspects described above or any of various implementations thereof.

Specifically, the apparatus includes a processor configured to call and run a computer program from a memory to enable a device in which the apparatus installed to perform the method in any one of the above first and second aspects or various implementation modes thereof.

In an eighth aspect, there is provided a computer readable storage medium for storing a computer program that enables a computer to perform the method according to any one of the first and second aspects described above or any of various implementations thereof.

In a ninth aspect, a computer program product is provided, including computer program instructions that enable a computer to perform the method in any one of the above first to second aspects or various implementation thereof.

In a tenth aspect, there is provided a computer program, which, when running on a computer, enables the computer to perform the method according to any one of the first and third aspects described above or any of various implementations thereof.

According to the above technical solution, since power boosting made to overcome the interference of eMBB depends on resource positions of eMBB and URLLC, interpreting the power adjustment information based on the first corresponding relationship makes power controlling for URLLC be more targeted and more efficient.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without paying an inventive effort are within the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system, or another communication system.

Generally speaking, traditional communication systems support a limited quantity of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and the implementations of the present disclosure may also be applied to these communication systems.

Optionally, a communication system in the implementations of the present disclosure may be applied to a carrier aggregation (CA) scenario, a dual connectivity (DC) scenario, or a standalone (SA) scenario.

Implementations of the present disclosure do not limit frequency spectrums applied. For example, implementations of the present disclosure may be applied to both licensed spectrum and unlicensed spectrum.

Figure 1:
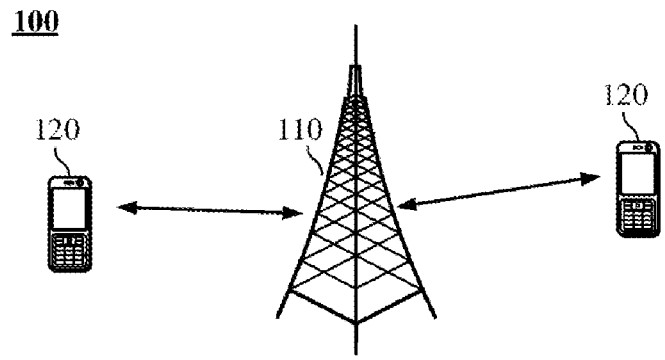
FIG. 1 is a schematic diagram of an architecture of a communication system provided by an implementation of the present disclosure.

Illustratively, a communication system 100 applied in an implementation of the present disclosure is shown in FIG. 1. The communication system 100 may include a network device 110, which may be a device that communicates with a terminal device 120 (or referred to as a communication terminal, or a terminal). The network device 110 may provide communication coverage for a specific geographical area, and may communicate with terminal devices located within the coverage area.

FIG. 1 illustrates one network device and two terminal devices. Optionally, the communication system 100 may include multiple network devices, and other quantities of terminal devices may be included within the coverage area of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

Implementations of the present disclosure describe various implementations in combination with a terminal device and a network device, wherein the terminal device may also be referred to User Equipment (UE), an access terminal, a subscriber unit, a subscriber station, a mobile station, a rover platform, a remote station, a remote terminal, a mobile device, a user terminal, a terminal, a wireless communication equipment, a user agent or a user device, etc. The terminal device may be a STATION (ST) in WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, a vehicle-mounted device, a wearable device, and a next generation communication system, such as, a terminal device in an NR network, or a terminal device in a future evolving Public Land Mobile Network (PLMN), etc.

By way of example but not limitation, in an implementation of the present disclosure, the terminal device may also be a wearable device. A wearable device may also be referred to a wearable intelligent device, which is a general term of wearable devices developed by intelligent design of daily wear using wearing technology, e.g., glasses, gloves, watches, clothing, shoes, etc. A wearable device is a portable device that is worn directly on a body or integrated into the clothes or accessories of a user. Wearable devices are not only hardware devices, but also realize powerful functions through software support, data interaction and cloud interaction. Generalized wearable smart devices include devices that are full functioned, large sized, and may realize complete or partial functions without relying on smart phones, such as smart watches or smart glasses, and include devices that only focus on a certain kind of application and need to be used in conjunction with other devices such as smart phones, such as various smart bracelets and smart jewelry for monitoring physical signs.

The network device may be a device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device or a gNB in an NR network, or a network device in a future evolved PLMN network, etc.

In an implementation of the present disclosure, the network device provides a service for a cell, and the terminal device communicates with the network device through a transmission resource (e.g., a frequency domain resource or a spectrum resource) used by the cell. The cell may be a cell corresponding to the network device (e.g., a base station), and the cell may belong to a macro base station, or may belong to a base station corresponding to a Small cell. The Small cell here may include: a Metro cell, a Micro cell, a Pico cell, a Femto cell, etc. These Small cells have characteristics of a small coverage range and a low transmitting power, and are suitable for providing a high-speed data transmission service.

Figure 2:
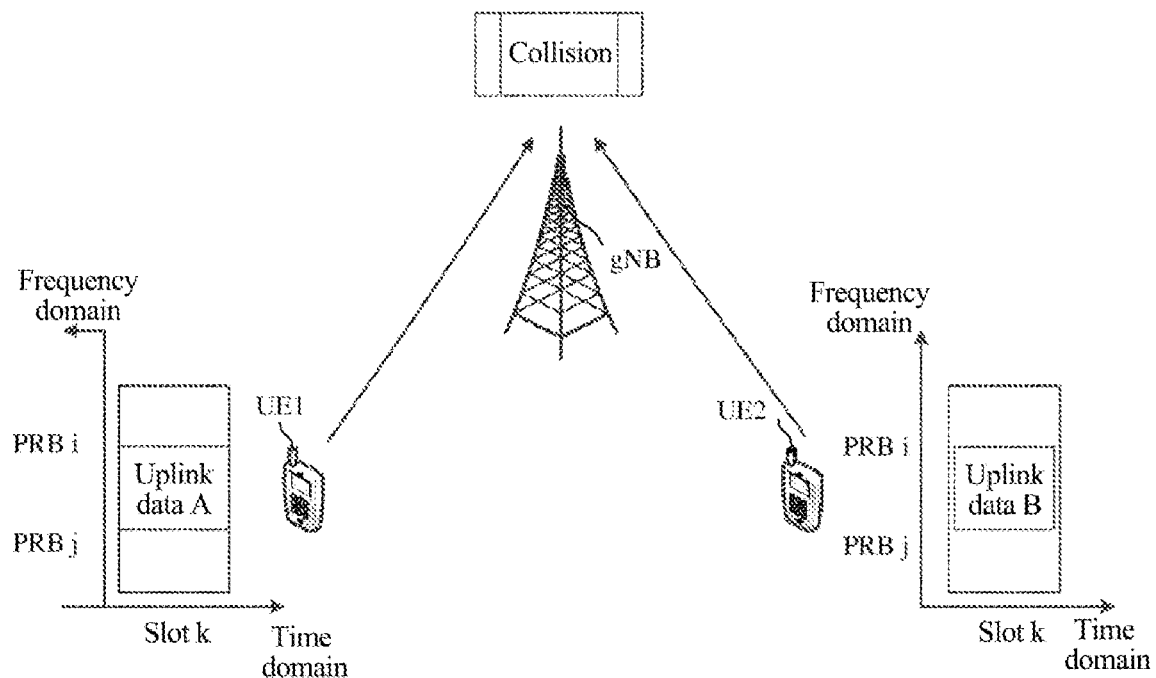
FIG. 2 is a schematic diagram of collision between uplink eMBB and uplink URLLC according to an implementation of the present disclosure.

As shown in FIG. 2, UE1 sends uplink data A for eMBB to a gNB on a time domain resource of a slot k and frequency domain resources from physical resource block (PRB) j to PRB i, and UE2 sends uplink data B for URLLC to the gNB on a time domain resource of the slot k and the frequency domain resources from PRB j to PRB i, so there will be a collision between uplink eMBB and uplink URLLC at the gNB.

As to a problem of a transmission collision between uplink URLLC and uplink eMBB, it is as shown in FIG. 2. There are two mainstream solutions: 1) stopping an eMBB transmission and reducing an interference to URLLC, 2) improving a transmit power of URLLC, and even if an interference of eMBB exists, it can be ensured that a receiving SINR of URLLC satisfies a demodulation requirement. The former eliminates the interference thoroughly, but needs to increase complexity of an eMBB terminal. The latter keeps a receiving Signal to Interference plus Noise Ratio (SINR) by increasing a power of a useful signal, and only URLLC needs to be enhanced.

It should be understood that uplink power controlling in a wireless communication system is very important. Through uplink power controlling, a UE in a cell may be caused not only to ensure a quality of uplink data sent, but also to decrease an interference to another user in the system as much as possible and to prolong a service time of a UE battery.

At present, power controlling realized in an uplink in NR Release 15 (Rel 15) mainly includes power controlling and configuring of following channels:
Physical Uplink Shared Channel (PUSCH) power controlling,
Physical Uplink Control Channel (PUCCH) power controlling,
Sounding Reference Signal (SRS) channel power controlling,
Physical Random Access Channel (PRACH) power controlling,
configuring a UE reporting power margin, and supporting periodic and event-triggered reporting.

In addition, in order to support inter-cell interference coordination, it is necessary to transmit load and interference information on an X2 interface.

At present, a transmit power of PUSCH may be calculated by a following formula 1:

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\} \quad (i)$$

Herein, i is an index of a PUSCH transmission, and j is an index of an open-loop power controlling parameter (including a target power $P_{O\_PUSCH,b,f,c}(j)$ and a path loss factor $\alpha_{b,f,c}(j)$); $q_d$ is an index of a reference signal used for performing measurement of a path loss, (vi which is used for obtaining a value of the path loss $PL_{b,f,c}(q_d)$, and it is also an open-loop power controlling parameter; $f_{b,f,c}(i,l)$ is a closed-loop power controlling adjustment factor, wherein l is a closed-loop power controlling process.

Specifically, the terminal device determines the closed-loop power adjustment factor according to a Transmit Power Control (TPC) command field sent by the network device, wherein the TPC command field may be carried by Downlink Control Information (DCI) for scheduling the PUSCH in a terminal device search space, or by a DCI format 2_2 for carrying a group TPC command field in a common search space.

It should be understood that NR Rel15 indicates a closed-loop adjustment power by using Group common DCI (e.g. the DCI format 2_2) and UE specific DCI (e.g. a DCI format 0_0/0_1).

A feature of a mode of Group common DCI is: 1) one piece of DCI contains power indication information of multiple users; and 2) multiple field values in DCI are for multiple users. Herein, an index of a field where a user is, a target base station, or other information is configured by a higher layer signaling.

A feature of a mode of UE specific DCI is: power adjustment information for the user is indicated in a user-specific scheduling signaling. The UE specific DCI includes a DCI format 0_0 and a DCI format 0_1.

The uplink power controlling includes open-loop power controlling and closed-loop power controlling.

1) Open-loop power controlling is setting a target receiving power, and roughly determining an uplink transmit power based on a path loss, a scheduling resource, a modulation and coding scheme, or the like.

2) Closed-loop power controlling is that, by faster self-adaptation, power adjustment information may be sent to a terminal in time, and an interference may be controlled and a power setting may be adjusted to adapt to a channel condition.

It should be noted that closed-loop power controlling (TPC information) is indicated by a DCI format 2_2 or terminal device specific (UE specific) DCI (a DCI format 1_0/1_1).

With respect to the DCI format 2_2, a URLLC user interfered by eMBB is not always in one DCI format 2_2, so the base station needs to send multiple DCI formats 2_2, thus increasing signaling overhead.

For the UE specific DCI, every URLLC user interfered should send indication information independently. Especially, for a semi-persistent or semi-static (Configured grant) transmission mode, a user does not need to receive the UE specific DCI to transmit data. However, in order to increase a power, it is necessary to receive/send indication for an extra power at this time, thus increasing signaling overhead.

Based on the above technical problem, the present disclosure proposes a solution of power controlling, that is, power adjustment information is resource-specific. Since power boosting made to overcome the interference of eMBB depends on resource positions of eMBB and URLLC, power parameter value information is resource-specific, which makes the power controlling be more targeted and more efficient.

The solution of power controlling designed for the above technical problem in the present disclosure is described as follows in detail.

Figure 3:
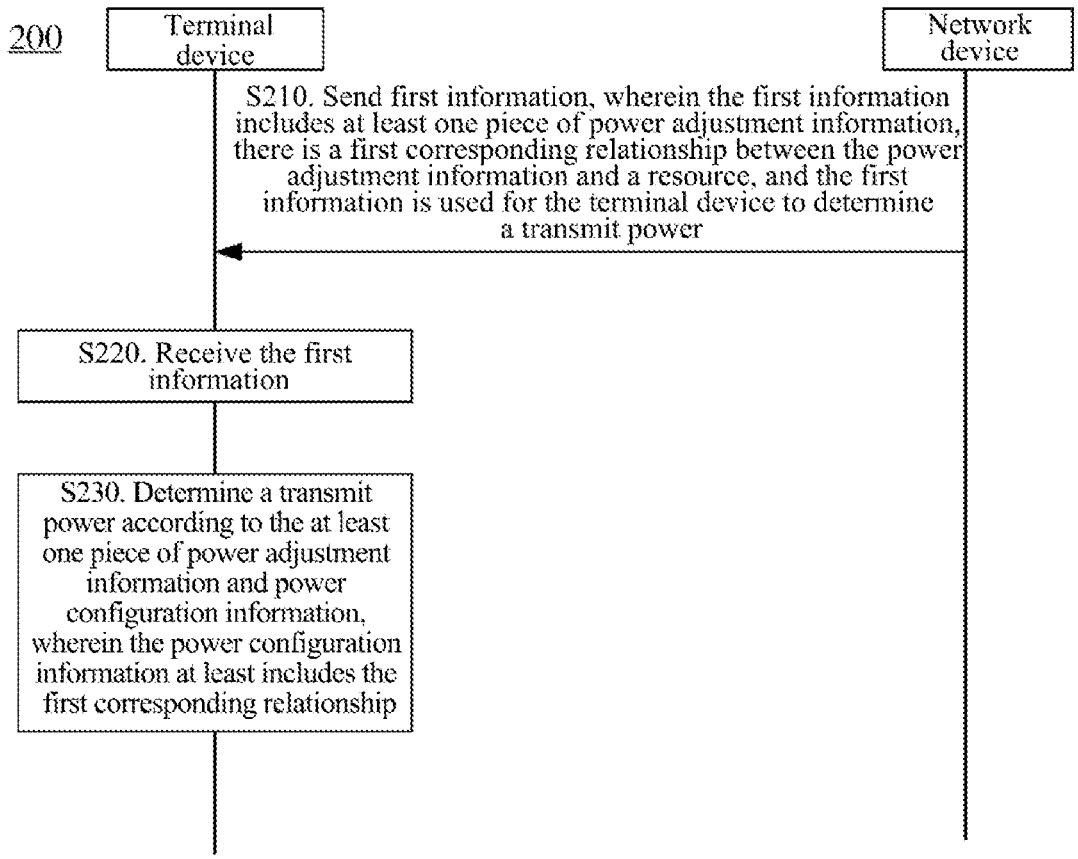
FIG. 3 is a schematic flowchart of a method for power controlling according to an implementation of the present disclosure.

FIG. 3 is a schematic flowchart of a method 200 for power controlling according to an implementation of the present disclosure. As shown in FIG. 3, the method 200 may include following acts of S210 to S230.

In S210, a network device sends first information to a terminal device, wherein the first information includes at least one piece of power adjustment information, there is a first corresponding relationship between the power adjustment information and a resource, and the first information is used for the terminal device to determine a transmit power.

In S220, the terminal device receives the first information.

In S230, the terminal device determines a transmit power according to the at least one piece of power adjustment information and power configuration information, wherein the power configuration information at least includes the first corresponding relationship.

It should be understood that an implementation of the present disclosure may be applied to a scenario where there is a transmission collision between uplink URLLC and uplink eMBB, and is mainly used to control a transmit power of uplink URLLC, so as to overcome an interference caused by a transmission of uplink eMBB to a transmission of uplink URLLC, for example, to control a transmit power of uplink URLLC in PUSCH and/or PUCCH.

It should also be understood that in an implementation of the present disclosure, the transmit power may also be referred to as a transmitting power.

Optionally, the first information may be DCI, or may be a broadcast or a system broadcast. That is, a signaling carrying the power adjustment information may be DCI, or may be a broadcast or a system broadcast.

Optionally, the first information may be only for the terminal device, that is, the first information is a terminal device specific signaling. For example, in a case that the first information is DCI, the first information may be only for the terminal device. Of course, in a case that the first information is the broadcast or the system broadcast, the first information may also be only for the terminal device. The first information may also be directed to a terminal device group that at least includes the terminal device, that is, the first information is a terminal device group specific signaling. For example, in a case that the first information is the broadcast or the system broadcast, the first information may be directed to a terminal device group that at least includes the terminal device.

It should be noted that when the first information may only be directed to the terminal device, configuration is simple, and overhead of a higher layer signaling is small. When the first information is directed to a terminal device group which at least includes the terminal device, terminal devices in the terminal device group may share the at least one piece of power adjustment information carried by the first information, thereby reducing signaling overhead of the physical layer.

Optionally, in the above act S210, the network device may send the first information based on the power configuration information.

Optionally, in an implementation of the present disclosure, after receiving the first information, the terminal device may interpret the at least one piece of power adjustment information carried by the first information based on the power configuration information, so as to determine a transmit power on a corresponding resource. That is, in the above act S230, the terminal device may determine the transmit power on the corresponding resource according to the at least one piece of power adjustment information and the power configuration information.

Optionally, before the terminal device receives the first information, the terminal device may determine the power configuration information. For example, when the power configuration information is configured by the network device through a higher layer signaling (e.g., a Radio Resource Control (RRC) signaling, or a Media Access Control Control Element (MAC CE) signaling, etc.), the terminal device receives a signaling carrying the power configuration information. For another example, when the power configuration information is pre-configured or pre-determined by a protocol, the terminal device calls or reads the power configuration information.

Optionally, in an implementation of the present disclosure, the first corresponding relationship is pre-configured, or configured by the network device.

For example, the network device configures the first corresponding relationship through a higher layer signaling (e.g., an RRC signaling, an MAC CE signaling, etc.).

For another example, the protocol presets various corresponding relationships between power adjustment information and resources, and the network device may indicate which corresponding relationship the terminal device uses through a higher layer signaling, that is, indicate the first corresponding relationship among the various corresponding relationships between the power adjustment information and the resources to the terminal device. Therefore, system configuration flexibility is increased.

For another example, the network device pre-configures the terminal device with various corresponding relationships between power adjustment information and resources, and the network device may indicate which corresponding relationship the terminal device uses through a higher layer signaling, that is, indicate the first corresponding relationship among the various corresponding relationships between the power adjustment information and the resources to the terminal device. Therefore, system configuration flexibility is increased.

Optionally, the network device may send first configuration information to the terminal device, wherein the first configuration information includes at least one piece of power configuration information, the power configuration information at least including the first corresponding relationship. That is, the network device may configure at least one corresponding relationship between power adjustment information and a resource through the first configuration information.

Optionally, the resource in the first corresponding relationship includes at least one of following: a time domain resource, a frequency domain resource, or a time-frequency domain resource.

Optionally, the resource in the first corresponding relationship is determined through a preset rule and/or configuration by the network device.

Specifically, if the resource in the first corresponding relationship is determined through the preset rule, the first corresponding relationship satisfies at least one of following relationships: each of K indication fields in a group of power adjustment information corresponds to a full bandwidth resource or a partial bandwidth of at least one symbol in one slot; or each of L indication fields in a group of power adjustment information corresponds to a full bandwidth resource or a partial bandwidth of at least one symbol in N slots.

Figure 4:
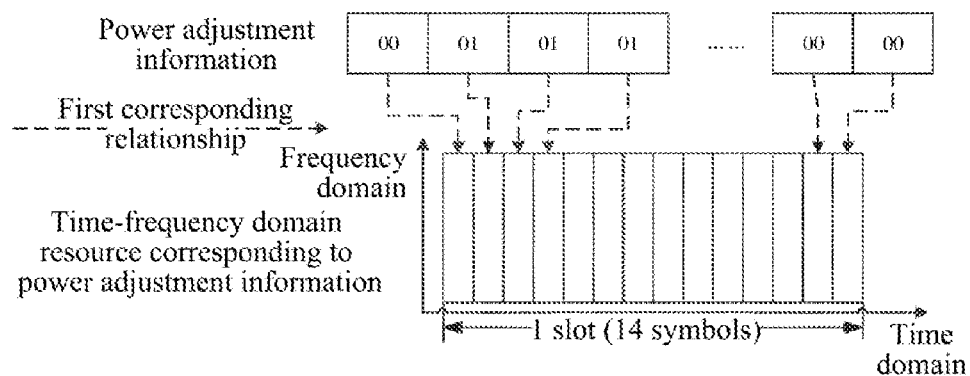
FIG. 4 is a schematic diagram of a first corresponding relationship according to an implementation of the present disclosure.

Optionally, as Example 1, the first corresponding relationship satisfies that a group of power adjustment information corresponds to the full bandwidth resource of one slot (14 symbols). For example, a group of power adjustment information may be used to correspond to the full bandwidth resource of one slot (14 symbols), and a group of power adjustment indication information contains 14 fields, wherein each field is for a full bandwidth resource of one symbol in the full bandwidth resource of the one slot (14 symbols). Assuming that each field uses 2 bits to indicate power adjustment information corresponding to one symbol, 14 fields need 28 bits in total, and every 2 bits sequentially indicate power adjustment information on a full bandwidth resource of one symbol, as shown in FIG. 4.

Optionally, as Example 2, the first corresponding relationship satisfies that N pieces of power adjustment information correspond to full bandwidth resources of N slots. For example, a group of power adjustment information may include N pieces of power adjustment information, wherein each piece of power adjustment information corresponds to the full bandwidth resource of one of the N slots. For example, as shown in FIG. 4, the group of power adjustment information contains 14 fields, wherein each field corresponds to a full bandwidth resource of one symbol in one slot.

Figure 5:
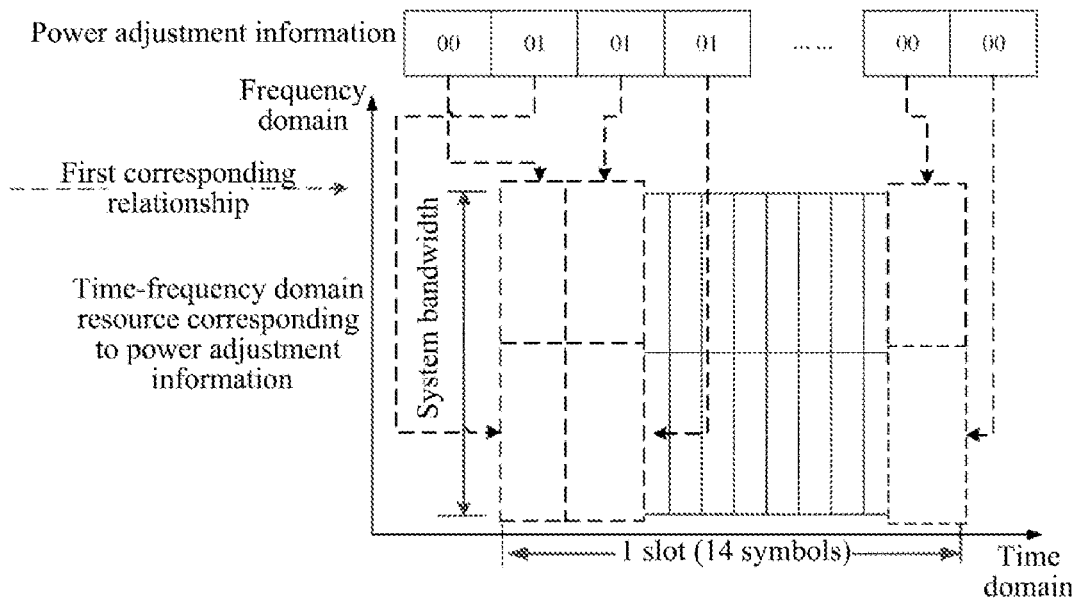
FIG. 5 is a schematic diagram of another first corresponding relationship according to an implementation of the present disclosure.

Optionally, as Example 3, the first corresponding relationship satisfies that each field in a group of power adjustment information corresponds to full bandwidth resources or ½ times of the full bandwidth resources of multiple symbols in one slot (14 symbols). As shown in FIG. 5, a group of power adjustment indication information contains 14 fields, wherein each field corresponds to ½ full bandwidth resources of every 2 symbols in full bandwidth resources of one slot (14 symbols). When each field uses 2 bits to indicate the power adjustment information, 14 fields need 28 bits, and every 2 bits sequentially indicate the power adjustment information of ½ full bandwidth resources of 2 symbols in one slot.

It should be noted that since URLLC scheduling is usually large in bandwidth, frequency domain resources may correspond to power adjustment information in a unit of full bandwidth or ½ times of bandwidth.

Specifically, if the resource in the first corresponding relationship is determined through configuration by the network device, the first corresponding relationship is a corresponding relationship between a power adjustment information bit and a pre-configured resource.

Optionally, if the resource in the first corresponding relationship is determined through configuration by the network device, the network device needs to configure a semi-persistent/semi-static (configured grant) resource. For example, the terminal device receives second information sent by the network device, wherein the second information is used for configuring at least one pre-configured resource. The pre-configured resource is a configured grant resource.

It should be noted that in order to reduce delay, URLLC uplink transmissions often use pre-configured resources, that is, data are sent on a pre-defined resource without a physical layer signaling, e.g., without DCI scheduling and also without a process such as Scheduling Request (SR) or Buffer Status Report (BSR) reporting, or the like. An indication of a time-frequency domain resource for URLLC transmitted on a configured grant may be configured based on the configured grant, which has technical advantages of signaling overhead reducing (configuration of the configured grant is limited, for example, a user configures 8 configured grant resources at most), and more accurate resource correspondence (compared with ½ times of bandwidth or a full bandwidth, indication granularity in this mode is PRB).

Optionally, in an implementation of the present disclosure, the power configuration information also includes a first spatial domain corresponding to the power adjustment information.

That is, in an implementation of the present disclosure, different interference degrees between different spatial domains are taken into account, and it is more accurate to indicate power controlling based on the spatial domain, so as to avoid unnecessary power boosting (for example, it is not necessary for two spatially orthogonal users to perform power boosting).

That is, the resource in the first corresponding relationship may include at least one of a time domain resource, a frequency domain resource, or a time-frequency domain resource, and may also include a beam domain resource and/or a precoding codebook domain resource.

It should be noted that the spatial domain may include the beam domain, or different precoding codebook domains on a same beam.

Optionally, the power configuration information specifically includes a first scrambling mode used by a signaling carrying the power adjustment information, wherein the first scrambling mode is used for indicating the first spatial domain corresponding to the power adjustment information. That is to say, after receiving the first information, the terminal device may interpret the first spatial domain corresponding to a scrambling mode of the first information based on the first scrambling mode. At this time, the at least one piece of power adjustment information carried by the first information corresponds to the first spatial domain. Furthermore, the network device needs to send the first information based on the first scrambling mode.

For example, the scrambling mode of the first information is A, and the first information includes power adjustment information 1 and power adjustment information 2. The terminal device may interpret the scrambling mode as A based on the first scrambling mode and determine a first spatial domain S, that is, both the power adjustment information 1 and the power adjustment information 2 correspond to the first spatial domain S.

Optionally, the first scrambling mode may be pre-configured or preset by a protocol, or configured by the network device. For example, the network device configures the first scrambling mode through a higher layer signaling.

It should be noted that, the first information may be scrambled through a Radio Network Temporary Identity (RNTI), e.g., one corresponding RNTI is configured for each spatial direction.

Optionally, the power configuration information specifically includes a bit position of the power adjustment information in a signaling carrying the power adjustment information, wherein the bit position is used for indicating the first spatial domain corresponding to the power adjustment information. That is, after receiving the first information, the terminal device may interpret the first spatial domain corresponding to the at least one piece of power adjustment information based on the bit position. Furthermore, the network device needs to send the first information based on the bit position.

For example, the first information includes power adjustment information 1 and power adjustment information 2, wherein the power adjustment information 1 is located in bit 1 in the first information, and the power adjustment information 2 is located in bit 2 in the first information. The terminal device may interpret the bit 1 based on the bit position, and determine a first spatial domain k, as well as interpret the bit 2 based on the bit position, and determine a first spatial domain t, that is, the power adjustment information 1 corresponds to the first spatial domain k, and the power adjustment information 2 corresponds to the first spatial domain t.

Optionally, the bit position may be pre-configured or preset by a protocol, or configured by the network device. For example, the network device configures the bit position through a higher layer signaling.

Optionally, in an implementation of the present disclosure, the power configuration information also includes a first Band Width Part (BWP) corresponding to the power adjustment information.

It should be noted that since BWPs of different users are different, that is, frequency domain bandwidths in resources are different, it is necessary to determine a unified bandwidth definition. Otherwise, it is difficult for the network device to indicate a unified time-frequency domain resource through one signaling.

Optionally, the first BWP is a reference bandwidth, wherein the reference bandwidth is pre-configured, or configured by the network device. For example, the reference bandwidth is a system bandwidth.

Optionally, the power configuration information specifically includes a second scrambling mode used by a signaling carrying the power adjustment information, wherein the second scrambling mode is used for indicating the first BWP corresponding to the power adjustment information. That is to say, after receiving the first information, the terminal device may interpret the first BWP corresponding to a scrambling mode of the first information based on the second scrambling mode. At this time, the at least one piece of power adjustment information carried by the first information corresponds to the first BWP. Furthermore, the network device needs to send the first information based on the second scrambling mode.

For example, the scrambling mode of the first information is B, and the first information includes power adjustment information 1 and power adjustment information 2. The terminal device may interpret the scrambling mode as B based on the second scrambling mode, and determine a first spatial domain P, that is, both the power adjustment information 1 and the power adjustment information 2 correspond to the first spatial domain P.

Optionally, the second scrambling mode may be pre-configured or preset by a protocol, or configured by the network device. For example, the network device configures the second scrambling mode through a higher layer signaling.

It should be noted that the first information may be scrambled by an RNTI, for example, each BWP is configured with a corresponding RNTI.

For example, DCI with Cyclical Redundancy Check (CRC) scrambled by RNTI 1 indicates 1-100 PRBs of a maximum bandwidth of the system, and DCI with CRC scrambled by RNTI 2 indicates 101-200 PRBs of a maximum bandwidth.

Optionally, the terminal device is configured with at least one BWP, and each BWP in the at least one BWP is configured with one piece of the power configuration information. That is, for a terminal device, power configuration information is independently configured under each BWP configuration, and power adjustment information under the BWP is read based on the power configuration information.

It should be noted that for different terminal devices, for power parameters under a same BWP configuration, RNTIs are the same at least, so that different terminal devices working in the same BWP may share one piece of DCI.

Optionally, the network device sends second configuration information to the terminal device, wherein the second configuration information is used for configuring at least one BWP, and each of the at least one piece of power configuration information is for one BWP of the at least one BWP.

Optionally, in an implementation of the present disclosure, the power configuration information also includes at least one piece of timing information, wherein the at least one piece of timing information is used for indicating effective time of the at least one piece of power adjustment information.

It should be noted that the at least one piece of timing information may enable the terminal device to have enough time to analyze the first information and the at least one piece of power adjustment information carried by the first information, and a power may be adjusted after determining a transmit power on a corresponding resource.

Optionally, the timing information includes, but is not limited to, at least one of following: a time period, a kind of capability information of a terminal device, or a next uplink transmission.

It should be noted that the capability information of the terminal device may reflect a minimum processing time from a downlink transmission to feedback and uplink scheduling to an uplink transmission, that is, the timing information may be a kind of capability information of the terminal device.

Optionally, the timing information is pre-configured, or configured by the network device.

Optionally, in an implementation of the present disclosure, the power configuration information also includes at least one piece of following information: an RNTI used for scrambling CRC of DCI carrying the power adjustment information, wherein the first information is DCI; a size of a signaling carrying the power adjustment information; or in a scenario of multiple carriers, a bit or index information of the power adjustment information of at least one carrier in the multiple carriers.

It should be noted that if the signaling carrying the power adjustment information is transmitted through PDCCH, when the power configuration information includes an RNTI used for scrambling CRC of DCI carrying the power adjustment information, and/or a size of a signaling carrying the power adjustment information, it may help the terminal device to blindly detect the PDCCH, thus acquiring the signaling carrying the power adjustment information faster.

When the power configuration information includes a bit or index information of the power adjustment information of at least one carrier in multiple carriers in a scenario of the multiple carriers, the scenario of the multiple carriers may be extended to be supported.

It should be noted that, in an implementation of the present disclosure, power boosting made for overcoming an interference of eMBB is same for all interfered users, that is, it is sufficient to supplement an interference energy of eMBB to ensure that receiving SINRs of the interfered users on a receiving side will not become too bad. Therefore, it is not necessary to use a user-specific power indication.

Therefore, in an implementation of the present disclosure, since the power adjustment information is resource-specific, the power controlling is more targeted and more efficient. Furthermore, the power adjustment information is sent in a user group exclusive or broadcast mode, that is, multiple users sharing information will not affect performance, while signaling overhead may be reduced.

Figure 6:
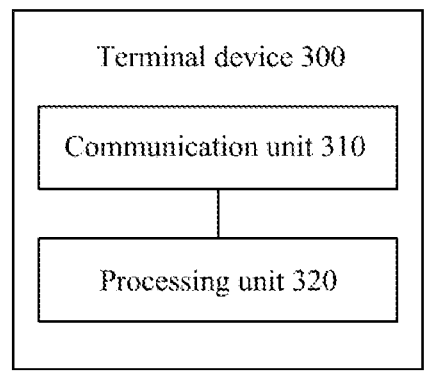
FIG. 6 is a schematic block diagram of a terminal device according to an implementation of the present disclosure.

FIG. 6 is a schematic block diagram of a terminal device 300 according to an implementation of the present disclosure. As shown in FIG. 6, the terminal device 300 includes a communication unit 310 and a processing unit 320.

The communication unit 310 is configured to receive first information, wherein the first information includes at least one piece of power adjustment information.

The processing unit 320 is configured to determine a transmit power according to the at least one piece of power adjustment information and power configuration information, wherein the power configuration information at least includes a first corresponding relationship, and the first corresponding relationship is a corresponding relationship between the power adjustment information and a resource.

Optionally, the first corresponding relationship is pre-configured, or configured by a network device.

Optionally, the resource in the first corresponding relationship is determined through a preset rule and/or configuration by the network device.

Optionally, if the resource in the first corresponding relationship is determined through the preset rule, the first corresponding relationship satisfies at least one of following relationships: each of K indication fields in a group of power adjustment information corresponds to a full bandwidth resource or a partial bandwidth of at least one symbol in one slot; or each of L indication fields in a group of power adjustment information corresponds to a full bandwidth resource or a partial bandwidth of at least one symbol in N slots.

Optionally, if the resource in the first corresponding relationship is determined through configuration by the network device, the first corresponding relationship is a corresponding relationship between a power adjustment information bit and a pre-configured resource.

Optionally, if the resource in the first corresponding relationship is determined through configuration by the network device, the communication unit 310 is further configured to receive second information, wherein the second information is used for configuring at least one pre-configured resource.

Optionally, the resource in the first corresponding relationship includes at least one of following: a time domain resource, a frequency domain resource, or a time-frequency domain resource.

Optionally, the power configuration information also includes a first spatial domain corresponding to the power adjustment information.

Optionally, the power configuration information specifically includes a first scrambling mode adopted by a signaling carrying the power adjustment information, wherein the first scrambling mode is used for indicating the first spatial domain corresponding to the power adjustment information.

Optionally, the power configuration information specifically includes a bit position of the power adjustment information in a signaling carrying the power adjustment information, wherein the bit position is used for indicating the first spatial domain corresponding to the power adjustment information.

Optionally, the power configuration information also includes a first BWP corresponding to the power adjustment information.

Optionally, the first BWP is a reference bandwidth, wherein the reference bandwidth is pre-configured, or configured by the network device.

Optionally, the power configuration information specifically includes a second scrambling mode adopted by a signaling carrying the power adjustment information, wherein the second scrambling mode is used for indicating the first BWP corresponding to the power adjustment information.

Optionally, the terminal device is configured with at least one BWP, and each BWP in the at least one BWP is configured with one piece of the power configuration information.

Optionally, the power configuration information also includes at least one piece of timing information, wherein the at least one piece of timing information is used for indicating effective time of the at least one piece of power adjustment information.

Optionally, the timing information includes at least one of following: a time period, a kind of capability information of a terminal device, or a next uplink transmission.

Optionally, the timing information is pre-configured, or configured by the network device.

Optionally, the power configuration information also includes at least one piece of following information: an RNTI used for scrambling CRC of DCI carrying the power adjustment information, wherein the first information is DCI; a size of a signaling carrying the power adjustment information; or a bit or index information of the power adjustment information of at least one carrier in multiple carriers in a scenario of the multiple carriers.

Optionally, the first information is a broadcast, or DCI.

Optionally, the first information is for a terminal device group which at least includes the terminal device.

It should be understood that the terminal device 300 according to an implementation of the present disclosure may correspond to the terminal device in a method implementation of the present disclosure, and the above-mentioned and other operations and/or functions of various units in the terminal device 300 are respectively for implementing the corresponding flows of the terminal device in the method 200 as shown in FIG. 3, which will not be repeated here for brevity.

Figure 7:
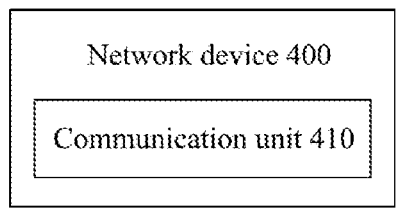
FIG. 7 is a schematic block diagram of a network device according to an implementation of the present disclosure.

FIG. 7 shows a schematic block diagram of a network device 400 according to an implementation of the present disclosure. As shown in FIG. 7, the network device 400 includes a communication unit 410.

The communication unit 410 is configured to send first information, wherein the first information includes at least one piece of power adjustment information, there is a first corresponding relationship between the power adjustment information and a resource, and the first information is used for a terminal device to determine a transmit power.

Optionally, the communication unit 410 is further configured to send first configuration information, wherein the first configuration information includes at least one piece of power configuration information, the power configuration information at least including the first corresponding relationship.

Optionally, the resource in the first corresponding relationship is determined through a preset rule and/or configuration by the network device 400.

Optionally, if the resource in the first corresponding relationship is determined through the preset rule, the first corresponding relationship satisfies at least one of following relationships: each of K indication fields in a group of power adjustment information corresponds to a full bandwidth resource or a partial bandwidth of at least one symbol in one slot; or each of L indication fields in a group of power adjustment information corresponds to a full bandwidth resource or a partial bandwidth of at least one symbol in N slots.

Optionally, if the resource in the first corresponding relationship is determined through configuration by the network device 400, the first corresponding relationship is a corresponding relationship between a power adjustment information bit and a pre-configured resource.

Optionally, if the resources in the first corresponding relationship are determined through the configuration by the network device 400, the communication unit 410 is further configured to send second information for configuring at least one pre-configured resource.

Optionally, the resource in the first corresponding relationship includes at least one of following: a time domain resource, a frequency domain resource, or a time-frequency domain resource.

Optionally, the power configuration information also includes a first spatial domain corresponding to the power adjustment information.

Optionally, the power configuration information specifically includes a first scrambling mode adopted by a signaling carrying the power adjustment information, wherein the first scrambling mode is used for indicating the first spatial domain corresponding to the power adjustment information.

Optionally, the power configuration information specifically includes a bit position of the power adjustment information in a signaling carrying the power adjustment information, wherein the bit position is used for indicating the first spatial domain corresponding to the power adjustment information.

Optionally, the power configuration information also includes a first BWP corresponding to the power adjustment information.

Optionally, the first BWP is a reference bandwidth, and the reference bandwidth is configured by the network device 400.

Optionally, the power configuration information specifically includes a second scrambling mode adopted by a signaling carrying the power adjustment information, wherein the second scrambling mode is used for indicating the first BWP corresponding to the power adjustment information.

Optionally, the communication unit 410 is further configured to send second configuration information, wherein the second configuration information is used for configuring at least one BWP, and each of the at least one piece of power configuration information is for one of the at least one BWP.

Optionally, the power configuration information also includes at least one piece of timing information, wherein the at least one piece of timing information is used for indicating effective time of the at least one piece of power adjustment information.

Optionally, the timing information includes at least one of following: a time period, a kind of capability information of a terminal device, or a next uplink transmission.

Optionally, the timing information is configured by the network device 400.

Optionally, the power configuration information also includes at least one piece of following information: an RNTI used for scrambling CRC of DCI carrying the power adjustment information, wherein the first information is DCI; a size of a signaling carrying the power adjustment information; or in a scenario of multiple carriers, a bit or index information of the power adjustment information of at least one carrier in the multiple carriers.

Optionally, the first information is a broadcast, or DCI.

Optionally, the first information is for a terminal device group which at least includes the terminal device.

It should be understood that the network device 400 according to an implementation of the present disclosure may correspond to the network device in the method implementations of the present disclosure. And the above and other operations and/or functions of various units in the network device 400 are respectively for implementing the corresponding process of the network device in the method 200 shown in FIG. 3, which is not repeated here again for brevity.

Figure 8:
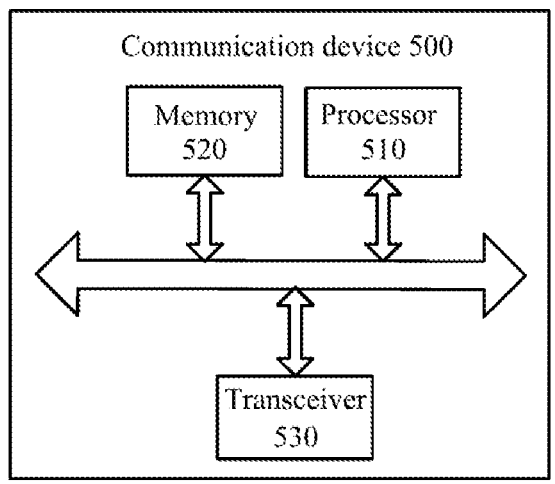
FIG. 8 is a schematic block diagram of a communication device according to an implementation of the present disclosure.

FIG. 8 is a schematic diagram of a structure of a communication device 500 in accordance with an implementation of the present disclosure. The communication device 500 shown in FIG. 8 includes a processor 510, which may call and run a computer program from a memory to implement the methods according to the implementations of the present disclosure.

Optionally, as shown in FIG. 8, the communication device 500 may further include a memory 520. The processor 510 may call and run the computer program from the memory 520 to implement the methods in the implementations of the present disclosure.

The memory 520 may be a separate device independent of the processor 510 or may be integrated in the processor 510.

Optionally, as shown in FIG. 8, the communication device 500 may further include a transceiver 530, and the processor 510 may control the transceiver 530 to communicate with other devices. Specifically, the transceiver 730 may send information or data to other devices or receive information or data sent by other devices.

The transceiver 530 may include a transmitter and a receiver. The transceiver 530 may further include antennas, and the number of which may be one or more.

Optionally, the communication device 500 may specifically be a network device of an implementation of the present disclosure, and the communication device 500 may implement the corresponding processes implemented by the network device in various methods of the implementations of the present disclosure, which will not be repeated herein for brevity.

Optionally, the communication device 500 may specifically be a mobile terminal/terminal device of an implementation of the present disclosure, and the communication device 500 may implement the corresponding processes implemented by the mobile terminal/terminal device in various methods of the implementations of the present disclosure, which will not be repeated here for brevity.

Figure 9:
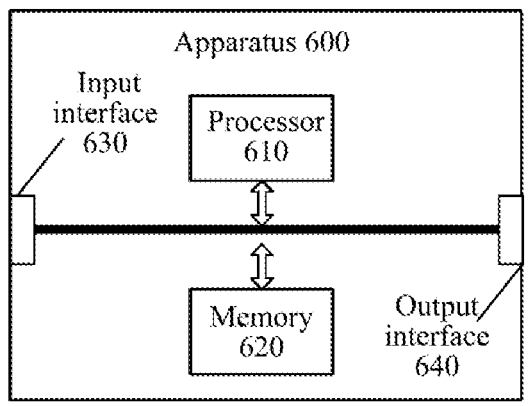
FIG. 9 is a schematic block diagram of an apparatus according to an implementation of the present disclosure.

FIG. 9 is a schematic diagram of a structure of an apparatus in accordance with an implementation of the present disclosure. The apparatus 600 shown in FIG. 9 includes a processor 610. The processor 610 may call and run a computer program from a memory to implement the methods in the implementations of the present disclosure.

Optionally, as shown in FIG. 9, the apparatus 600 may further include a memory 620. The processor 610 may call and run the computer program from the memory 620 to implement the methods in the implementations of the present disclosure.

The memory 620 may be a separate device independent of the processor 610 or may be integrated in the processor 610.

Optionally, the apparatus 600 may further include an input interface 630. The processor 610 may control the input interface 630 to communicate with other devices or chips. Specifically, the processor 1210 may acquire information or data sent by other devices or chips.

Optionally, the apparatus 600 may further include an output interface 640. The processor 610 may control the output interface 640 to communicate with other devices or chips. Specifically, the processor 1210 may output information or data to other devices or chips.

Optionally, the apparatus may be applied to the network device in the implementations of the present disclosure, and the apparatus may implement the corresponding processes implemented by the network device in various methods in accordance with the implementations of the present disclosure, which will not be repeated herein for brevity.

Optionally, the apparatus may be applied to a mobile terminal/terminal device in the implementations of the present disclosure, and the apparatus may implement the corresponding processes implemented by the mobile terminal/terminal device in various methods in accordance with the implementations of the present disclosure, which will not be repeated herein for brevity.

Optionally, the apparatus mentioned in an implementation of the present disclosure may also be a chip. For example, it may be a system-level chip, a system chip, a chip system, or a system chip-on-chip, etc.

Figure 10:
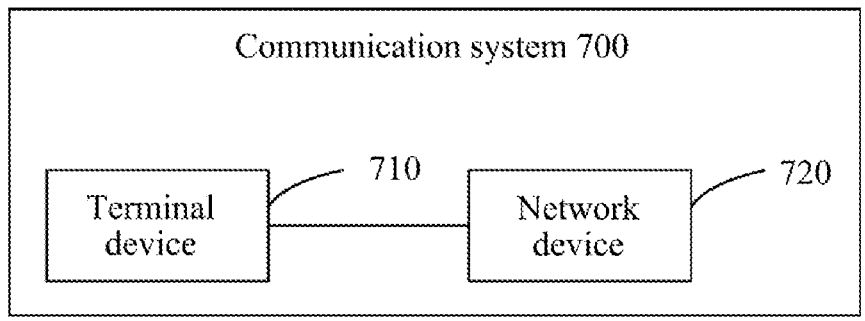
FIG. 10 is a schematic block diagram of a communication system according to an implementation of the present disclosure.

FIG. 10 is a schematic block diagram of a communication system 700 in accordance with an implementation of the present disclosure. As shown in FIG. 10, the communication system 700 may include a terminal device 710 and a network device 720.

Herein, the terminal device 710 may be configured to implement the corresponding functions implemented by the terminal device in the above methods, and the network device 720 may be configured to implement the corresponding functions implemented by the network device in the above methods, which will not be repeated herein for brevity.

It should be understood that the processor in the implementations of the present disclosure may be an integrated circuit chip having a signal processing capability. In an implementation process, each of the steps of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but is not limited to, these and any other suitable types of memories.

It should be understood that the foregoing memory is described in an illustrative but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but is not be limited to, these and any other suitable type of memory.

An implementation of the present disclosure further provides a computer-readable storage medium configured to store a computer program.

Optionally, the computer readable storage medium may be applied to a network device in an implementation of the present disclosure, and the computer program enables a computer to perform the corresponding processes implemented by the network device in various methods of the implementations of the present disclosure, which will not be repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device in an implementation of the present disclosure, and the computer program instructions enable a computer to perform the corresponding processes implemented by the network device in various methods of the implementations of the present disclosure, which will not be repeated here for brevity.

Optionally, the computer program product may be applied to a mobile terminal/terminal device in an implementation of the present disclosure, and the computer program instructions enable a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to the network device in the implementations of the present disclosure, and the computer program, when running on a computer, enables the computer to perform the corresponding processes implemented by the network device in various methods of the implementations of the present disclosure, which will not be repeated herein for brevity.

Optionally, the computer program may be applied to a mobile terminal/terminal device in an implementation of the present disclosure. When the computer program is run on a computer, the computer is enabled to perform the corresponding processes implemented by the mobile terminal/ terminal device in various methods of the implementations of the present disclosure, which will not be repeated here for brevity.

Those of ordinary skill in the art will recognize that the illustrative elements and algorithm acts in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, apparatuses and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if achieved in a form of software functional units and sold or used as a separate product, may be stored in a computer-readable storage medium. Regarding such understanding, the technical solution of the present disclosure, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present disclosure, but the protection scope of the present disclosure is not limited thereto. Any variation or substitution that may be easily conceived by a person familiar with the art within the technical scope disclosed by the present disclosure shall be included within the protection scope of the present disclosure. Therefore, the protection scope of the present disclosure shall be subject to the protection scope of the claims.

What is claimed is:

1. A method for power controlling, comprising:
receiving, by a terminal device, first information, wherein the first information comprises at least one piece of power adjustment information; and
determining, by the terminal device, a transmit power according to the at least one piece of power adjustment information and power configuration information, wherein the power configuration information at least comprises a first corresponding relationship, and the first corresponding relationship is a corresponding relationship between the power adjustment information and a resource; wherein the power configuration information also comprises a first spatial domain corresponding to the power adjustment information,
wherein the power configuration information specifically comprises a first scrambling mode adopted by a signaling carrying the power adjustment information, wherein the first scrambling mode is used for indicating the first spatial domain corresponding to the power adjustment information,
wherein the power configuration information specifically comprises a bit position of the power adjustment information in a signaling carrying the power adjustment information, wherein the bit position is used for indicating the first spatial domain corresponding to the power adjustment information.

2. The method of claim 1, wherein the first corresponding relationship is pre-configured, or configured by a network device,
wherein the resource in the first corresponding relationship is determined through a preset rule and/or configuration by the network device,
wherein the resource in the first corresponding relationship comprises at least one of following: a time domain resource, a frequency domain resource, or a time-frequency domain resource.

3. The method of claim 2, wherein if the resource in the first corresponding relationship is determined by the preset rule, the first corresponding relationship satisfies at least one of following relationships:
each of K indication fields in a group of power adjustment information corresponds to a full bandwidth resource or a partial bandwidth of at least one symbol in one slot; or
each of L indication fields in a group of power adjustment information corresponds to a full bandwidth resource or a partial bandwidth of at least one symbol in N slots,
wherein if the resource in the first corresponding relationship is determined through configuration by the network device, the first corresponding relationship is a corresponding relationship between a power adjustment information bit and a pre-configured resource,
wherein if the resource in the first corresponding relationship is determined through configuration by the network device, the method further comprises:
receiving, by the terminal device, second information, wherein the second information is used for configuring at least one pre-configured resource.

4. The method of claim 1, wherein the power configuration information also comprises a first Band Width Part (BWP) corresponding to the power adjustment information,
wherein the first BWP is a reference bandwidth, and the reference bandwidth is pre-configured or configured by a network device,
wherein the power configuration information specifically comprises a second scrambling mode adopted by a signaling carrying the power adjustment information, wherein the second scrambling mode is used for indicating the first BWP corresponding to the power adjustment information.

5. The method of claim 1, wherein the terminal device is configured with at least one Band Width Part (BWP), and each BWP in the at least one BWP is configured with one piece of the power configuration information.

6. The method of claim 1, wherein the power configuration information also comprises at least one piece of timing information, wherein the at least one piece of timing information is used for indicating effective time of the at least one piece of power adjustment information,
wherein the timing information comprises at least one of following: a time period, capability information of the terminal device, or a next uplink transmission,
wherein the timing information is pre-configured, or configured by a network device.

7. The method claim 1, wherein the power configuration information further comprises at least one piece of following information:
a Radio Network Temporary Identity (RNTI) used for scrambling Cyclical Redundancy Check (CRC) of Downlink Control Information (DCI) carrying the power adjustment information, wherein the first information is DCI;
a size of a signaling carrying the power adjustment information; or
a bit or index information of the power adjustment information of at least one carrier in multiple carriers in a scenario of the multiple carriers,
wherein the first information is a broadcast or DCI,
wherein the first information is for a terminal device group which at least comprises the terminal device.

8. A method for power controlling, comprising:
sending, by a network device, first information, wherein the first information comprises at least one piece of power adjustment information, there is a first corresponding relationship between the power adjustment information and a resource, and the first information is used for a terminal device to determine a transmit power, and
sending, by the network device, first configuration information, wherein the first configuration information comprises at least one piece of power configuration information, the power configuration information at least comprising the first corresponding relationship,
wherein the resource in the first corresponding relationship is determined through a preset rule and/or configuration by the network device,
wherein the resource in the first corresponding relationship comprises at least one of following: a time domain resource, a frequency domain resource, or a time-frequency domain resource; wherein the power configuration information also comprises a first spatial domain corresponding to the power adjustment information,
wherein the power configuration information specifically comprises a first scrambling mode adopted by a signaling carrying the power adjustment information, wherein the first scrambling mode is used for indicating the first spatial domain corresponding to the power adjustment information,
wherein the power configuration information specifically comprises a bit position of the power adjustment information in a signaling carrying the power adjustment information, wherein the bit position is used for indicating the first spatial domain corresponding to the power adjustment information.

9. The method of claim 8, wherein if the resource in the first corresponding relationship is determined through the preset rule, the first corresponding relationship satisfies at least one of following relationships:
each of K indication fields in a group of power adjustment information corresponds to a full bandwidth resource or a partial bandwidth of at least one symbol in one slot; or each of L indication fields in a group of power adjustment information corresponds to a full bandwidth resource or a partial bandwidth of at least one symbol in N slots, wherein if the resource in the first corresponding relationship is determined through configuration by the network device, the first corresponding relationship is a corresponding relationship between a power adjustment information bit and a pre-configured resource, wherein if the resource in the first corresponding relationship is determined through configuration by the network device, the method further comprises:

sending, by the network device, second information, wherein the second information is used for configuring at least one pre-configured resource.

10. The method of claim 8, wherein the power configuration information also comprises a first Band Width Part (BWP) corresponding to the power adjustment information, wherein the first BWP is a reference bandwidth, and the reference bandwidth is configured by the network device, wherein the power configuration information specifically comprises a second scrambling mode adopted by a signaling carrying the power adjustment information, wherein the second scrambling mode is used for indicating the first BWP corresponding to the power adjustment information.

11. The method of claim 8, further comprising:

sending, by the network device, second configuration information, wherein the second configuration information is used for configuring at least one Band Width Part (BWP), and each of the at least one piece of power configuration information is for one of the at least one BWP, wherein the power configuration information also comprises at least one piece of timing information, wherein the at least one piece of timing information is used for indicating effective time of the at least one piece of power adjustment information, wherein the timing information comprises at least one of following: a time period, capability information of a terminal device, or a next uplink transmission, wherein the timing information is configured by the network device.

12. The method of claim 8, wherein the power configuration information further comprises at least one piece of following information:

a Radio Network Temporary Identity (RNTI) used for scrambling Cyclical Redundancy Check (CRC) of Downlink Control Information (DCI) carrying the power adjustment information, wherein the first information is DCI;

a size of a signaling carrying the power adjustment information; or a bit or index information of the power adjustment information of at least one carrier in multiple carriers in a scenario of the multiple carriers, wherein the first information is a broadcast or DCI, wherein the first information is for a terminal device group which at least comprises the terminal device.

13. A network device, comprising: a processor and a transceiver, wherein the transceiver is configured to send first information, wherein the first information comprises at least one piece of power adjustment information, there is a first corresponding relationship between the power adjustment information and a resource, and the first information is used for a terminal device to determine a transmit power; and send first configuration information, wherein the first configuration information comprises at least one piece of power configuration information, the power configuration information at least comprising the first corresponding relationship, wherein the resource in the first corresponding relationship is determined through a preset rule and/or configuration by the network device, wherein the resource in the first corresponding relationship comprises at least one of following: a time domain resource, a frequency domain resource, or a time-frequency domain resource; wherein the power configuration information also comprises a first spatial domain corresponding to the power adjustment information, wherein the power configuration information specifically comprises a first scrambling mode adopted by a signaling carrying the power adjustment information, wherein the first scrambling mode is used for indicating the first spatial domain corresponding to the power adjustment information, wherein the power configuration information specifically comprises a bit position of the power adjustment information in a signaling carrying the power adjustment information, wherein the bit position is used for indicating the first spatial domain corresponding to the power adjustment information.

14. The network device of claim 13, wherein if the resource in the first corresponding relationship is determined through the preset rule, the first corresponding relationship satisfies at least one of following relationships:

each of K indication fields in a group of power adjustment information corresponds to a full bandwidth resource or a partial bandwidth of at least one symbol in one slot; or each of L indication fields in a group of power adjustment information corresponds to a full bandwidth resource or a partial bandwidth of at least one symbol in N slots, wherein if the resource in the first corresponding relationship is determined through configuration by the network device, the first corresponding relationship is a corresponding relationship between a power adjustment information bit and a pre-configured resource, wherein if the resource in the first corresponding relationship is determined through configuration by the network device, the transceiver is further configured to send second information, wherein the second information is used for configuring at least one pre-configured resource.

15. The network device of claim 13, wherein the power configuration information also comprises a first Band Width Part (BWP) corresponding to the power adjustment information, wherein the first BWP is a reference bandwidth, and the reference bandwidth is configured by the network device, wherein the power configuration information specifically comprises a second scrambling mode adopted by a signaling carrying the power adjustment information, wherein the second scrambling mode is used for indicating the first BWP corresponding to the power adjustment information.

16. The network device of claim 13, wherein the transceiver is further configured to send second configuration information, wherein the second configuration information is used for configuring at least one Band Width Part (BWP), and each of the at least one piece of power configuration information is for one of the at least one BWP, wherein the power configuration information also comprises at least one piece of timing information, wherein the at least one piece of timing information is used for indicating effective time of the at least one piece of power adjustment information, wherein the timing information comprises at least one of following: a time period, capability information of a terminal device, or a next uplink transmission, wherein the timing information is configured by the network device.

17. The network device of claim 13, wherein the power configuration information also comprises at least one piece of following information:

a Radio Network Temporary Identity (RNTI) used for scrambling Cyclical Redundancy Check (CRC) of Downlink Control Information (DCI) carrying the power adjustment information, wherein the first information is DCI;

a size of a signaling carrying the power adjustment information; or a bit or index information of the power adjustment information of at least one carrier in multiple carriers in a scenario of the multiple carriers, wherein the first information is a broadcast or DCI, wherein the first information is for a terminal device group which at least comprises the terminal device.

* * * * *